US008068312B2

(12) United States Patent
Jiang et al.

(10) Patent No.: US 8,068,312 B2
(45) Date of Patent: Nov. 29, 2011

(54) PERPENDICULAR MAGNETIC WRITE HEAD WITH STITCHED NOTCHED TRAILING SHIELD

(75) Inventors: Ming Jiang, San Jose, CA (US); Changqing Shi, Mountain View, CA (US)

(73) Assignee: Hitachi Global Technologies Netherlands B.V., Amsterdam (NL)

( * ) Notice: Subject to any disclaimer, the term of this patent is extended or adjusted under 35 U.S.C. 154(b) by 1040 days.

(21) Appl. No.: 11/944,157

(22) Filed: Nov. 21, 2007

(65) Prior Publication Data

US 2009/0128953 A1 May 21, 2009

(51) Int. Cl.
G11B 5/147 (2006.01)

(52) U.S. Cl. ............ 360/125.3; 360/125.06; 360/125.08

(58) Field of Classification Search ............. 360/125.02, 360/125.03, 125.3, 125.06, 125.08
See application file for complete search history.

(56) References Cited

U.S. PATENT DOCUMENTS

| | | | | |
|---|---|---|---|---|
| 6,960,281 B2 | 11/2005 | Han et al. | .................. | 204/192.34 |
| 7,271,982 B2 * | 9/2007 | MacDonald et al. | .... | 360/125.02 |
| 7,375,926 B1 * | 5/2008 | Stoev et al. | .............. | 360/125.01 |
| 2005/0259355 A1 | 11/2005 | Gao et al. | ...................... | 360/125 |
| 2006/0082924 A1 * | 4/2006 | Etoh et al. | ..................... | 360/125 |
| 2006/0092564 A1 * | 5/2006 | Le | ................................. | 360/126 |
| 2006/0231523 A1 | 10/2006 | Baer et al. | ........................ | 216/22 |
| 2006/0288565 A1 * | 12/2006 | Le et al. | ..................... | 29/603.12 |
| 2007/0019327 A1 | 1/2007 | Maruyama et al. | ........... | 360/126 |
| 2007/0035878 A1 | 2/2007 | Guthrie et al. | ................ | 360/125 |
| 2007/0247748 A1 * | 10/2007 | Ikeda et al. | .................... | 360/126 |
| 2008/0266724 A1 * | 10/2008 | Yazawa et al. | ................ | 360/319 |
| 2009/0097159 A1 * | 4/2009 | Otagiri et al. | .............. | 360/125.3 |
| 2009/0103211 A1 * | 4/2009 | Chen et al. | .............. | 360/125.03 |
| 2009/0116145 A1 * | 5/2009 | Guan et al. | ............... | 360/125.02 |
| 2009/0147410 A1 * | 6/2009 | Jiang et al. | ..................... | 360/319 |
| 2009/0152234 A1 * | 6/2009 | Guthrie et al. | .................. | 216/22 |
| 2009/0152235 A1 * | 6/2009 | Hsiao et al. | ..................... | 216/22 |
| 2009/0166183 A1 * | 7/2009 | Liu et al. | .................. | 204/192.11 |
| 2009/0190256 A1 * | 7/2009 | Schabes et al. | ................ | 360/121 |
| 2009/0268350 A1 * | 10/2009 | Hsiao et al. | .................... | 360/319 |
| 2009/0273863 A1 * | 11/2009 | Kawano et al. | ................ | 360/319 |
| 2010/0091413 A1 * | 4/2010 | Nunokawa et al. | ........... | 360/319 |

* cited by examiner

Primary Examiner — Jefferson Evans
(74) Attorney, Agent, or Firm — Zilka-Kotab, PC (57) ABSTRACT

A magnetic write head for perpendicular magnetic recording having a stitched notched trailing shield. The trailing shield includes a first pedestal portion having sides that are self aligned with the sides of the write pole and having a back edge that extends a first shield throat height. The shield further includes a second shield portion stitched onto the pedestal portion, the second shield portion having a back edge that extends beyond the back edge of the pedestal portion.

8 Claims, 14 Drawing Sheets

PERPENDICULAR MAGNETIC WRITE HEAD WITH STITCHED NOTCHED TRAILING SHIELD

FIELD OF THE INVENTION

The present invention relates to perpendicular magnetic recording and more particularly to a magnetic write head having a stitched notched trailing shield structure for improved magnetic performance.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS. but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

Although such perpendicular magnetic recording heads have the potential to increase data density over longitudinal recording system, the ever increasing demand for increased data rate and data density requires even further improvement in write head design. For example it is desirable to increase the write field gradient for better data error rate performance. One way to do this is to place a trailing shield adjacent to the trailing edge of the write pole. However, manufacturing limitations and design limitations have limited the performance of such a trailing shields, resulting in less than optimal write field and transition curvature. Therefore, there is a strong felt need for a write head design that can provide optimal write head performance, including optimal trailing shield performance. There is also a strong felt need for a practical method for manufacturing such a write pole having such an optimal design.

SUMMARY OF THE INVENTION

The present invention provides a write pole having a stitched notched trailing shield that maximizes the magnetic performance of the write head. The trailing shield includes a magnetic pedestal portion that is separated from the trailing edge of the write pole by a non-magnetic trailing gap layer. The pedestal portion has sides that are aligned with the sides of the write pole, and has a back edge that extends a first distance from the air bearing surface. The shield also includes a second (or main) magnetic shield portion formed over and stitched to the pedestal portion, the main shield portion can have a back edge that extends beyond the back edge of the pedestal portion to form a step at a back edge of the shield away from the air bearing surface. The second (or main) shield portion can have also have a width that extends beyond the sides of the pedestal portion, thereby forming a trailing shield with a notch in the air bearing surface (ABS) of the shield, as well as a step in back away from the air bearing surface. The notched trailing shield modifies of the write pole field contour for less transition curvature. The stitched notched trailing shield also has better writability due to less flux shunting to the side and back of trailing shield, while also preventing saturation of the trailing shield.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
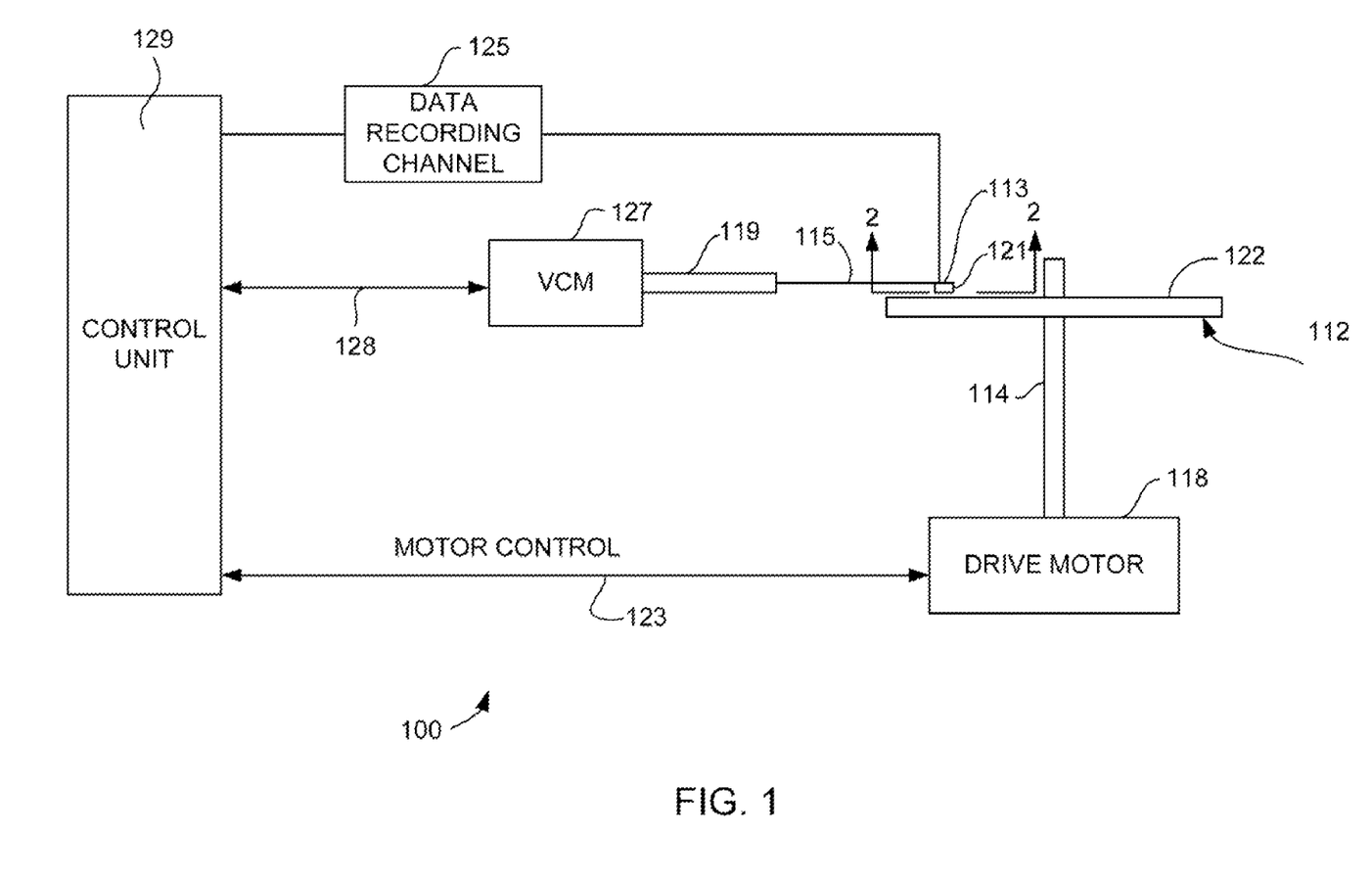
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
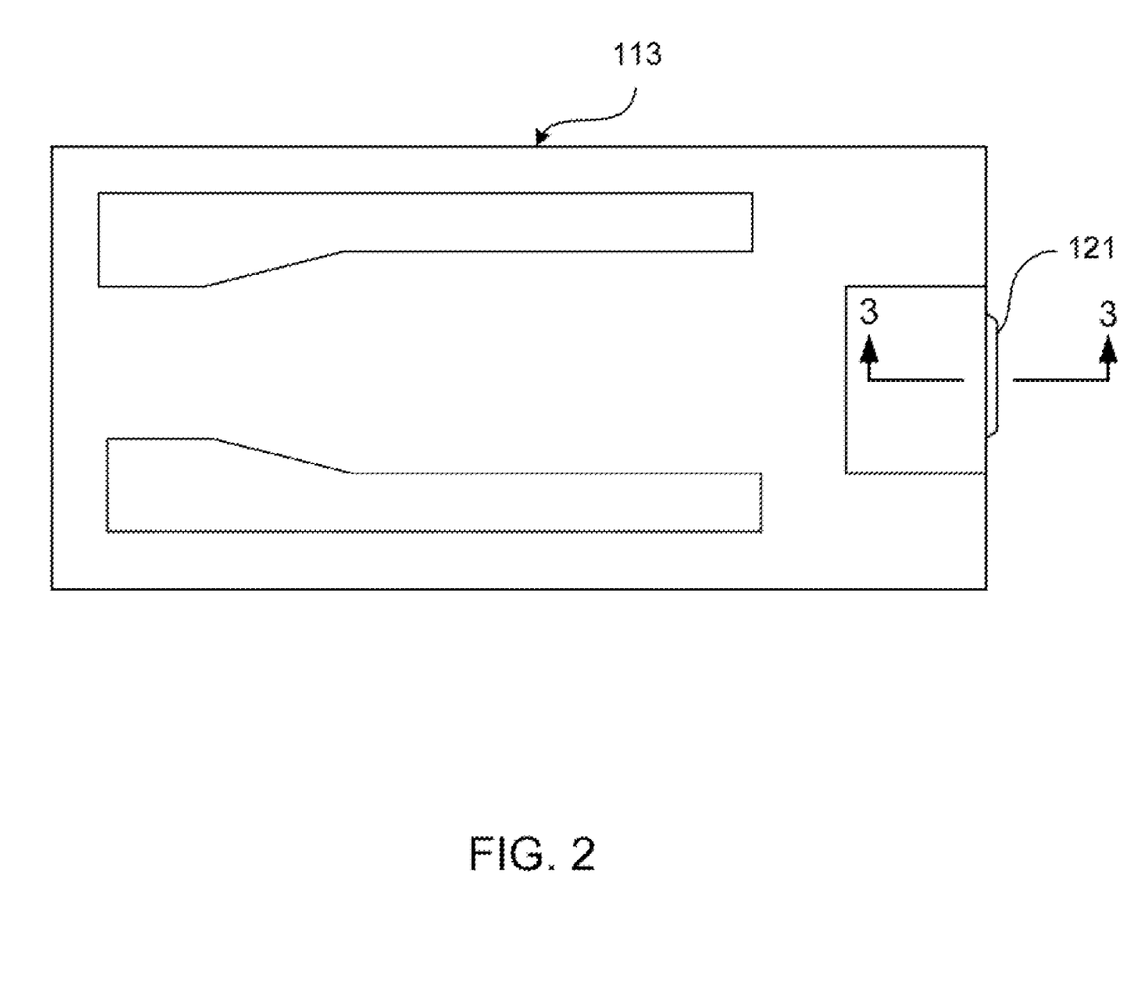
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
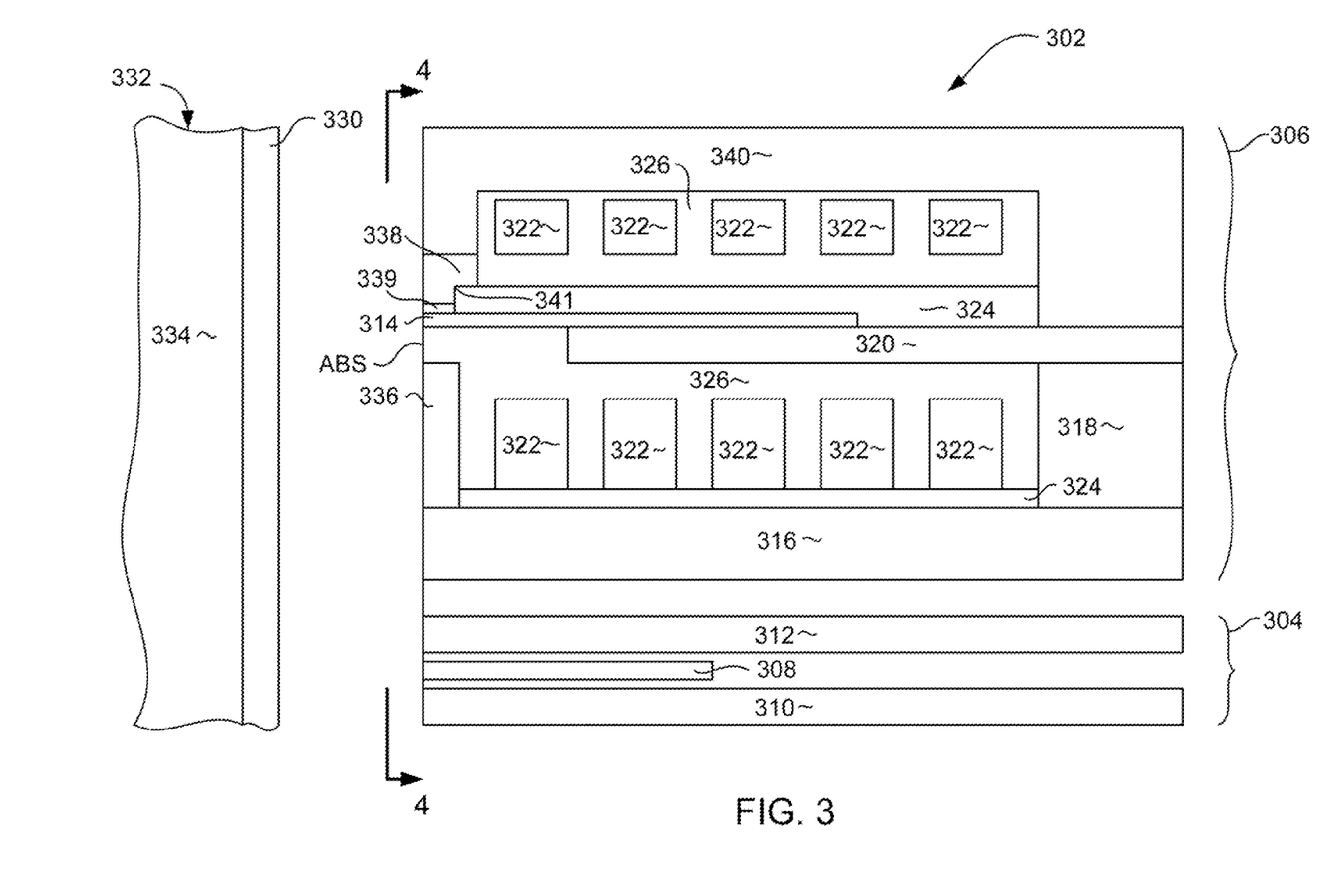
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322, a resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and week that it does not erase the data bit recorded by the write head 314.

In order to increase write field gradient, and therefore, increase the speed with which the write head 306 can write data, a trailing magnetic shield 338 can be provided. The trailing magnetic shield 338 is separated from the write pole by a non-magnetic write gap 339, and may be connected with the shaping layer 320 and/or back gap 318 by a trailing return pole 340. The trailing shield attracts the magnetic field from the write pole 314, which slightly cants the angle of the magnetic field emitting from the write pole. This canting of the write field increases the speed with which write field polarity can be switched on the magnetic medium by increasing the field gradient.

With reference still to FIG. 3, the stitched trailing shield has a step 341 formed at its back edge away from the ABS. This step 341 improves the performance enhancing effects of the trailing shield by achieving better writability due to less flux shunting to back of trailing shield 338 while also preventing magnetic saturation of the trailing shield. This step 341 and a method for manufacturing such a step will be discussed in greater detail below.

Figure 4:
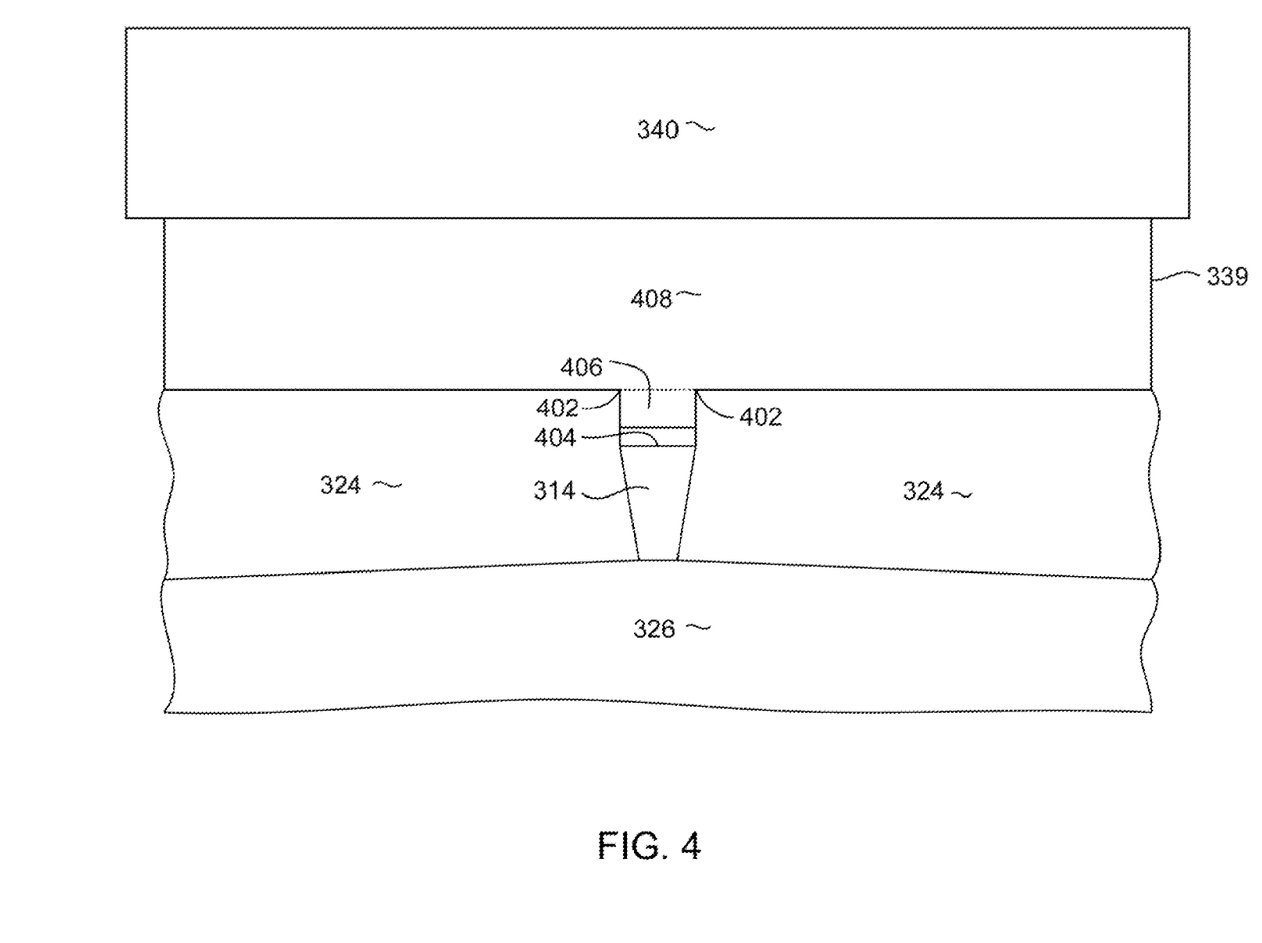
FIG. 4 is an ABS view of a portion of the write head of FIG. 3.

With reference now to FIG. 4, an enlarged view of the write pole 314 trailing shield 338 and trailing return pole 340 can be seen as viewed from the air bearing surface (ABS). As can be seen, the trailing shield 339 first and second notches 402 that are aligned with the sides of the trailing edge 404 of the write pole 314. These notches 402 are self aligned with the write pole 314 by a process that will be described below. The trailing shield 339 is actually a stitched structure that includes a self aligned, magnetic pedestal portion 406, and a main or trailing portion 408 of the trailing shield 339. The junction of the pedestal portion 406 and the main portion 408 is shown, for purposes of illustration, as a dotted line in FIG. 4. The pedestal portion can have a height in the down track direction of 40 nm (10-100 nm), which means that the notch 402 has this notch height (NH). The pedestal portion 406 can have a width of 40-200 nm, which corresponds to the track width of the write pole 314 (width of the write pole at it trailing edge 404). The notch modifies the write pole field contour for less transition curvature and providing optimal write field gradient. The notched trailing shield also has better writability due to less flux shunting to the side of trailing shield.

Figure 5:
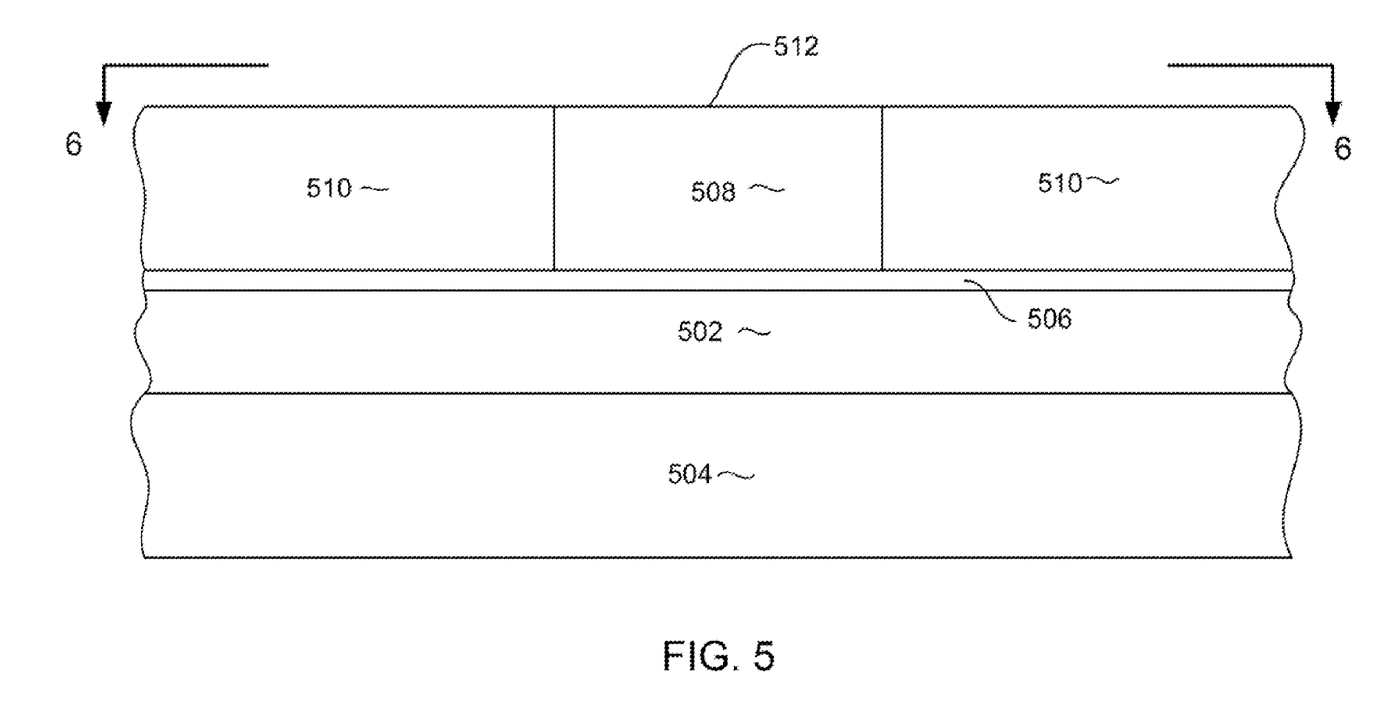
FIGS. 5-13 are views of a write head in various intermediate stages of manufacture illustrating method for manufacturing a write head according to an embodiment of the invention.

With reference now to FIGS. 5-12, a method is described for manufacturing a write head such as that described above. With particular reference to FIG. 5, a magnetic write pole material 502 is deposited over a substrate 504. The substrate 504 can include the alumina fill layer 326 and shaping layer 320 described with reference to FIG. 3. The magnetic write pole material 502 is preferably a laminate of magnetic layers separated by thin non-magnetic layers. A thin, non-magnetic hard mask (preferably alumina) 506 is then deposited over the write pole material 502. A magnetic pedestal 508, constructed of a material such as Ni—Fe is formed over the hard mask 506. The magnetic pedestal 508 is surrounded at its sides by a non-magnetic fill layer such as alumina 510.

Figure 6:
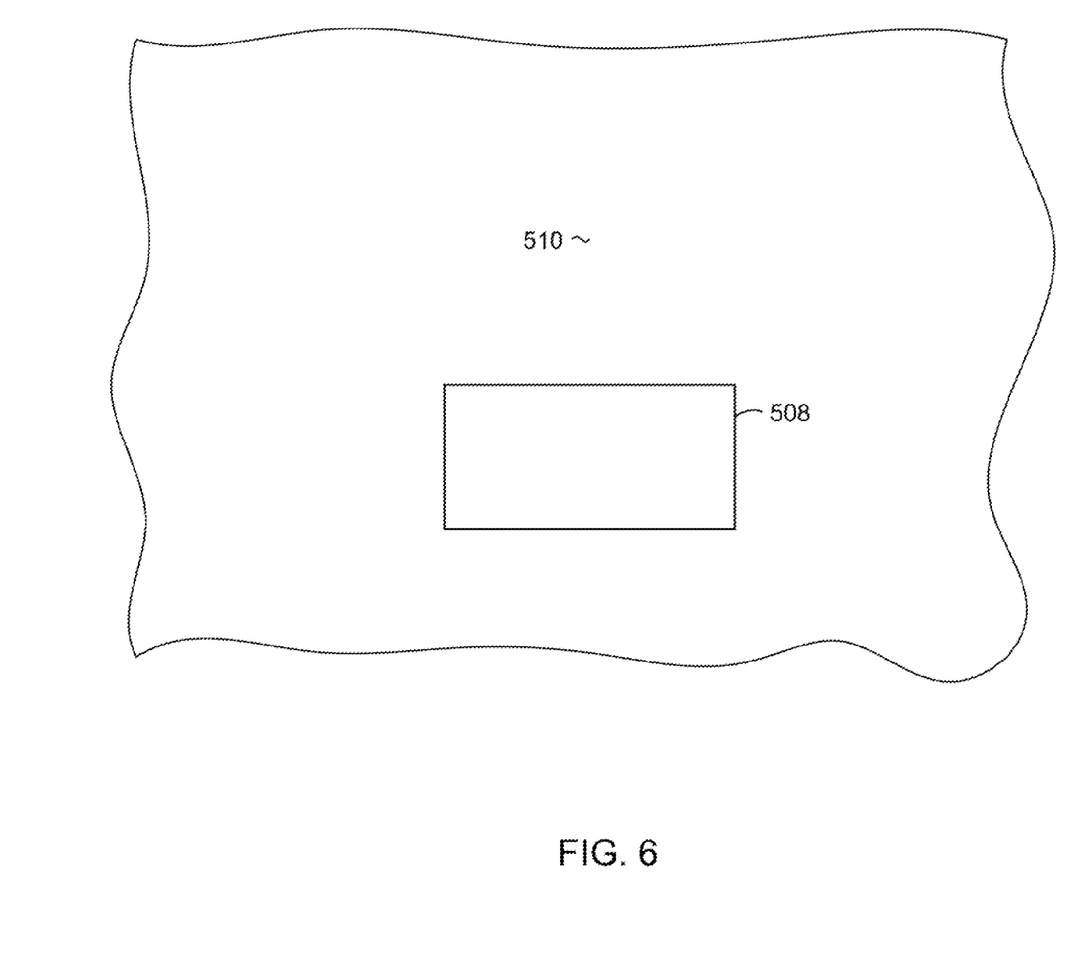

The pedestal 508 and fill layer 510 can be constructed by depositing an electrically conductive seed, layer, then forming a photoresist plating frame (not shown) with an opening where the pedestal 508 is to be formed. A magnetic material such as NiFe can be deposited into the plating frame to form the pedestal 508, and then the plating frame can be lifted off. A thick layer of alumina can then be deposited to cover the pedestal 508. A chemical mechanical polishing process (CMP) can then be performed to expose the pedestal, forming a planar surface 512 at the top of the fill layer 510 and pedestal 508. FIG. 6 shows a top down view of the structure shown in FIG. 5 (as indicated by line 6-6 of FIG. 5).

Figure 7:
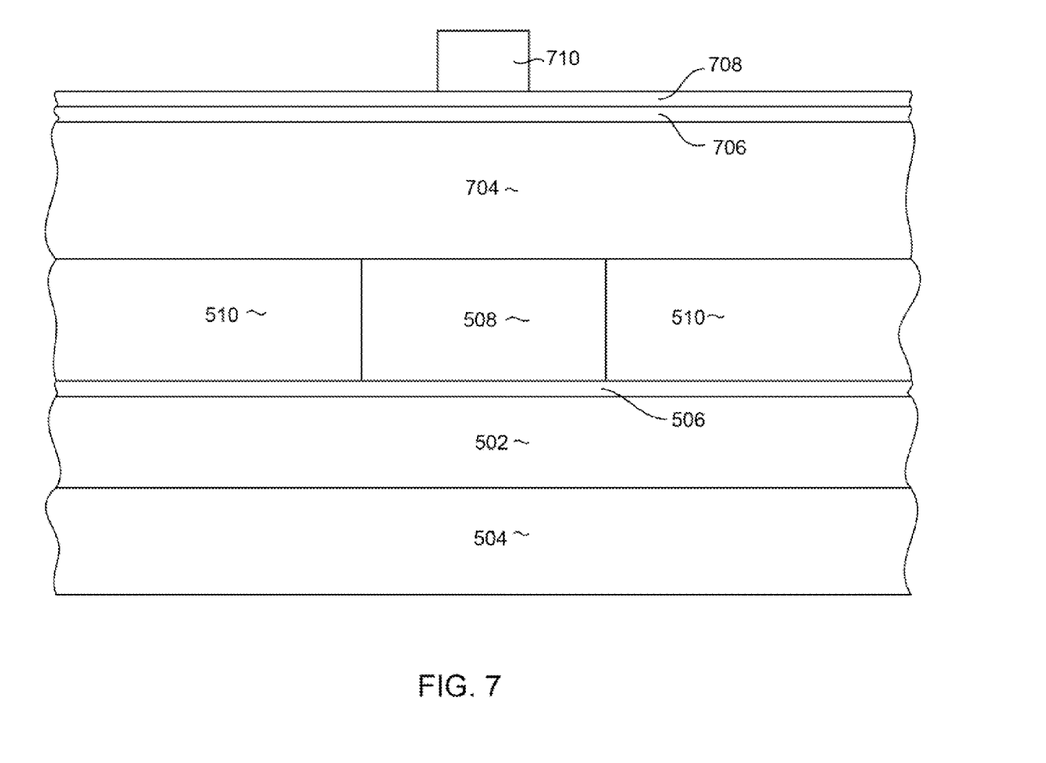

With reference now to FIG. 7 a mask structure 702 is formed over the pedestal 508 and fill layer 510. The mask structure can include a layer of a non-photoreactive polyimide such as DURAMIDE® 704, a $SiO_2$ hard mask layer 706, a bottom antireflective coating 708 (which can also be a material such as DURAMIDE®) and a photolithographically patterned and developed photoresist mask 710.

Figure 8A:
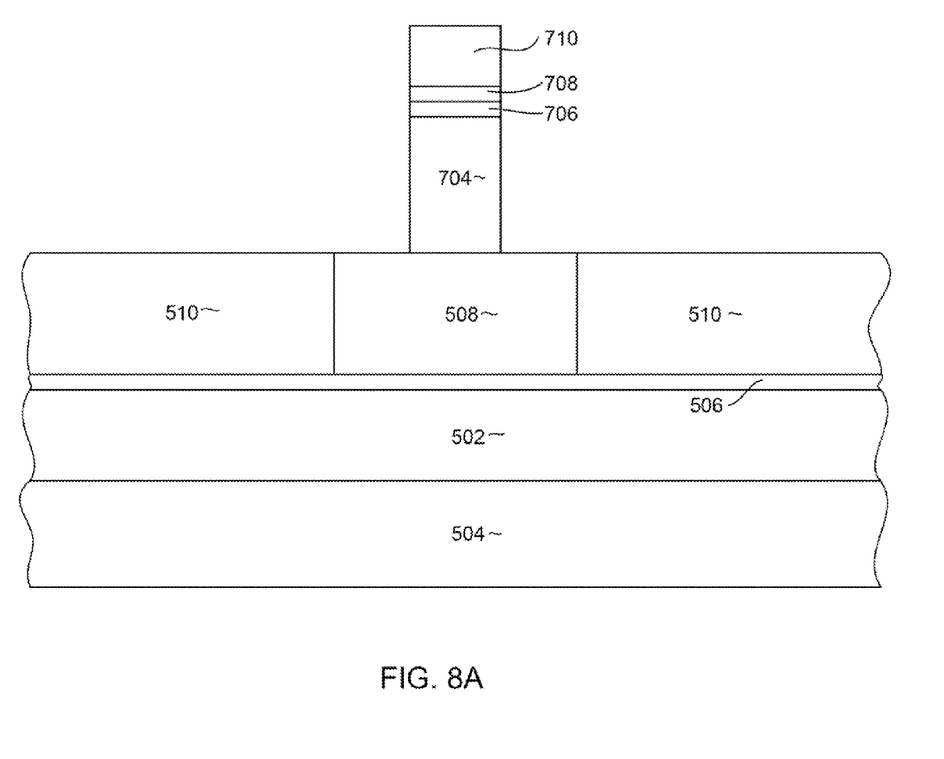
Figure 8B:
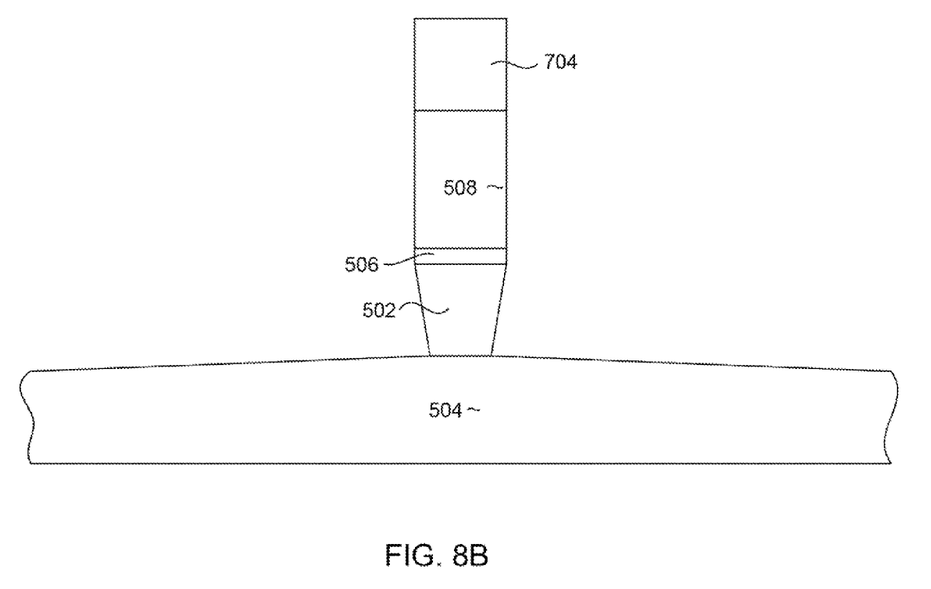
Figure 9:
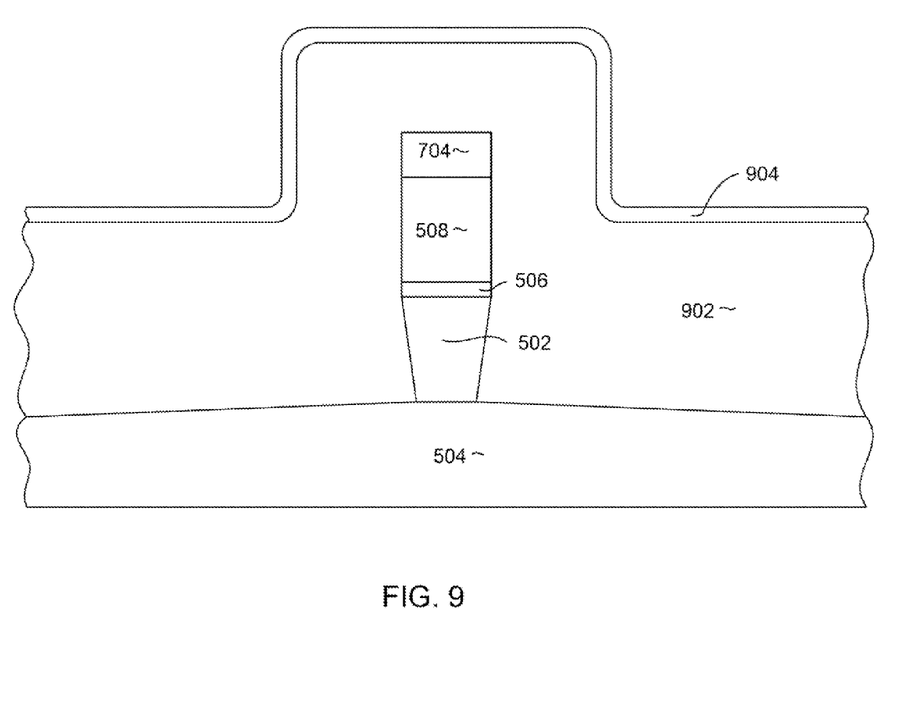

With reference to FIG. 8A, a Reactive Ion Etching (RIE) is performed to remove portions of the layers 704, 706, 708, 710 that are not protected by the photoresist mask 710, thereby transferring the image of the mask 710 onto the underlying layers 704, 706, 708, 710. Then, an ion milling can be performed to remove portions of the magnetic pedestal 508, hard mask 506, and magnetic write pole material 502 that are not protected by the mask structure 702, resulting in a structure as shown in FIG. 8B. The ion milling removes the layers 710, 708, 706 and a portion of the layer 704. A thick alumina fill layer 902 can then be deposited followed by a CMP stop layer 904, resulting in a structure as shown in FIG. 9. The ion milling used to form the write pole 502 can be performed at one or more angles relative to normal to form the write pole 502 with a tapered, trapezoidal shape as shown in FIG. 9. The till layer 902 can be alumina and is preferably deposited to a thickness such that the nominal thickness (away from the write pole 502) results in the alumina having a surface that is at a level between the top and bottom of the magnetic layer 508, and preferably closer to the top of the magnetic layer 508. The CMP stop layer is a material that is resistant to chemical mechanical polishing, such as Diamond Like Carbon (DLC), Rh, or Pt.

Figure 10:
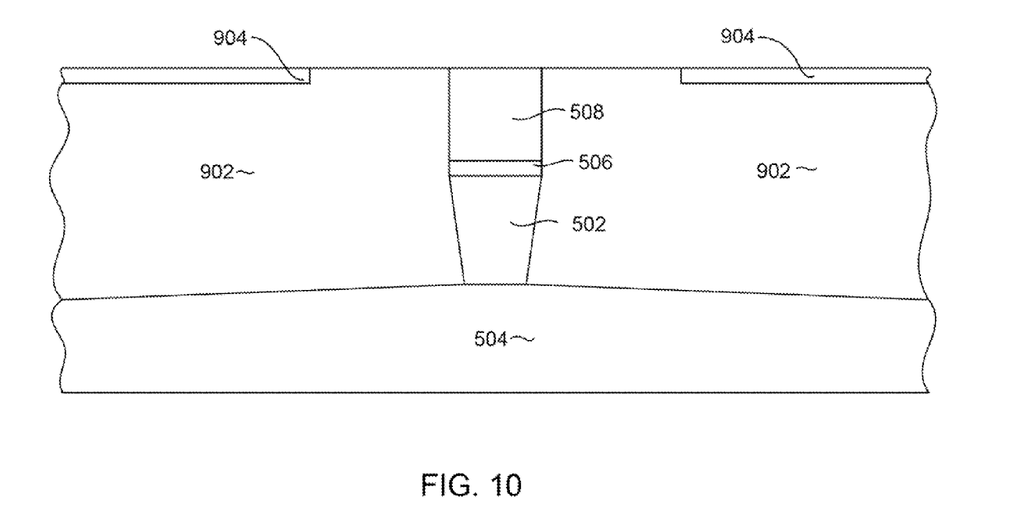
Figure 11:
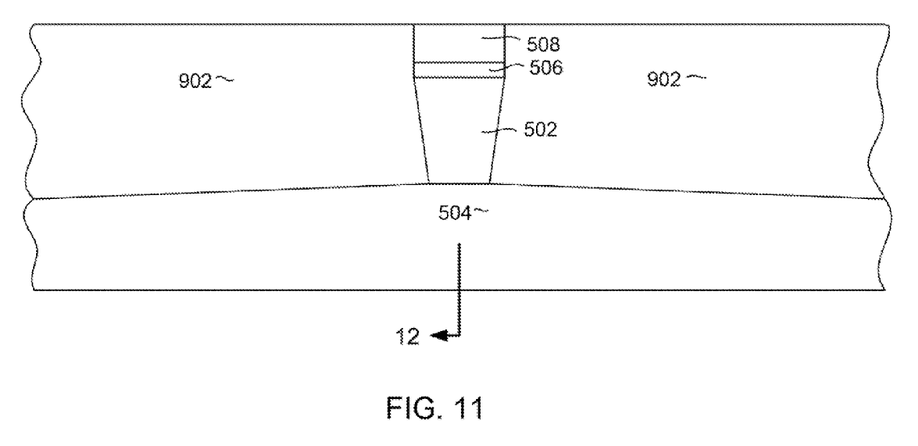

A chemical mechanical polishing process (CMP) can then be performed, resulting in a structure as shown in FIG. 10. This can be followed by an ion milling which removes the CMP stop layer 904 (as well as a portion of the fill layer 902 and pedestal 508, resulting in a structure such as that shown in FIG. 11.

Figure 12:
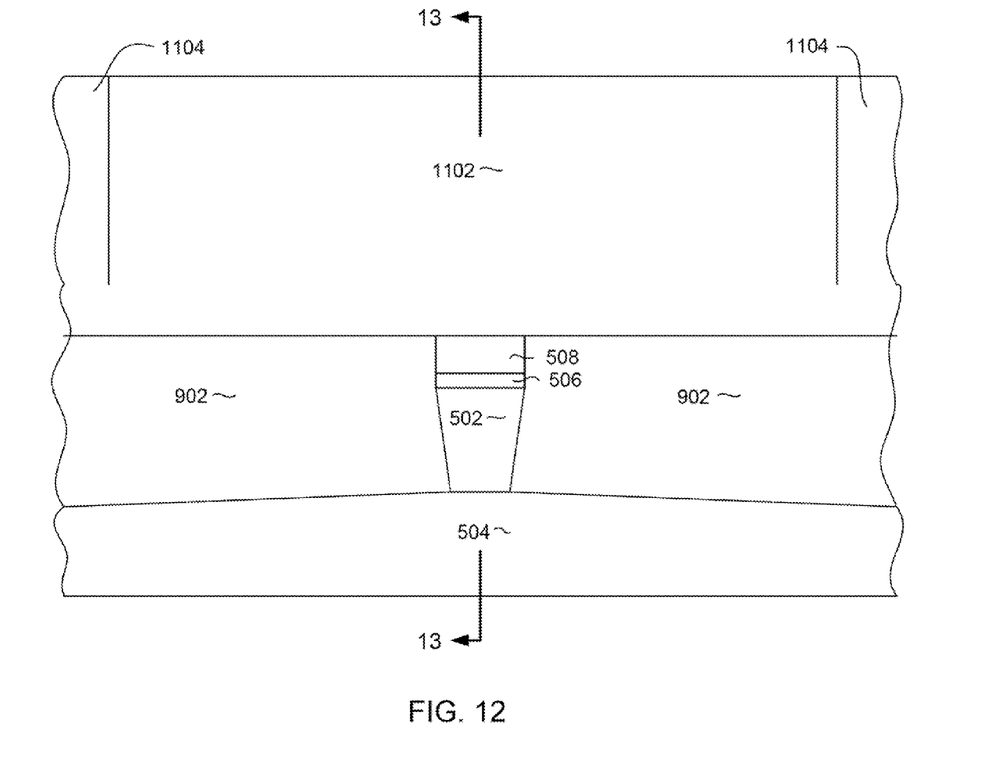

Then, with reference to FIG. 12, a magnetic shield structure 1102 can be plated onto the pedestal 508 and refill layer 902. The shield structure can be formed by depositing a seed layer, constructing a plating frame (such as from a patterned photoresist) and then electroplating a magnetic material such as NiFe into the plating frame. The plating frame can then be lifted off, and the seed layer removed. A fill material such as alumina 1104 can then be deposited, followed by a chemical mechanical polish to expose the shield 1102 and to form a planar surface 1206 across the fill layer 1104 and shield 1102.

Figure 13:
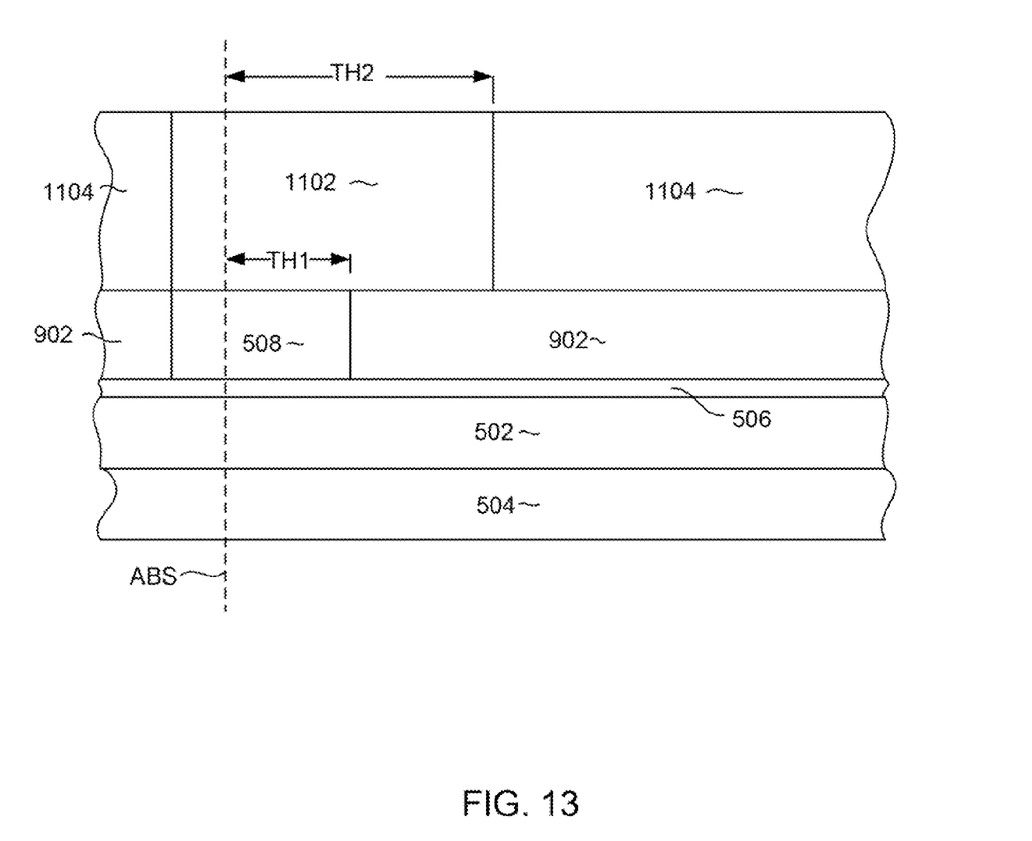

FIG. 13 shows a side, cross sectional view taken from line 13-13 of FIG. 12. An intended air bearing surface (ABS) plane is indicated by dashed line ABS in FIG. 13. The ABS plane indicates the location of air bearing surface that has not yet been formed, but will be formed later by a lapping process (not shown). As can be seen, by forming a pedestal 508 and a stitched main pole portion 1102, a notched shield structure can be formed that includes the pedestal portion 508 and main shield portion 1102, and which has a well controlled first throat height TH1 at a first distance from the ABS plane for the pedestal portion, and a second larger throat height TH2 for the main shield portion 1102. The first throat height TH1 can be 30-150 nm or about 30 nm. The second throat height TH2 can be 60-450 nm or about 180 nm. The relationship between TH1 and TH2 can be such that TH1 is about 25% to 75% of TH2. This thereby forms the notched shield structure described with reference to FIG. 3. In addition, with reference to FIG. 12, it can now be seen that the pedestal portion 508, as viewed from the ABS is self aligned with the write pole 502.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:
1. A write head for perpendicular magnetic recording, comprising:

a magnetic write pole having a pole tip extending to an air bearing surface and having a trailing edge and a leading edge; and a magnetic trailing shield that is separated from the trailing edge of the write pole by a non-magnetic trailing gap layer that is sandwiched between the magnetic trailing shield and the magnetic write pole;

the magnetic trailing shield further comprising:

a magnetic pedestal portion located adjacent to the non-magnetic trailing gap layer, the magnetic pedestal portion extending from the air bearing surface to a first trailing shield throat height (TH1); and a main shield portion that is magnetically connected with the magnetic pedestal portion, the main shield portion extending from the air bearing surface to a second throat height (TH2) that is greater than TH1;

wherein the pole tip of the write pole has first and second laterally opposed sides extending from the trailing edge to the leading edge, and wherein the magnetic pedestal portion of the trailing shield has first and second sides, that are aligned with the first and second sides of the write pole at the trailing edge.

2. A magnetic write head as in claim 1 wherein TH1 is 30-150 nm and TH2 is 60-450 nm.

3. A magnetic write head as in claim 1 wherein TH1 is 25 percent to 75 percent TH2.

4. A write head as in claim 1 wherein the pedestal portion has a thickness of 10-100 nm as measured from the non-magnetic trailing gap to the main shield portion.

5. A write head as in claim 1 wherein the magnetic pedestal portion and the main pedestal portion are constructed of the same material.

6. A write head as in claim 1 wherein the magnetic pedestal portion and the main shield portion are constructed of different magnetic materials.

7. A write head for perpendicular magnetic recording, comprising:

a magnetic write pole having a pole tip extending to an air bearing surface and having a trailing edge and a leading edge; and a magnetic trailing shield that is separated from the trailing edge of the write pole by a non-magnetic trailing gap layer that is sandwiched between the magnetic trailing shield and the magnetic write pole;

the magnetic trailing shield further comprising:

a magnetic pedestal portion located adjacent to the non-magnetic trailing gap layer, the magnetic pedestal portion extending from the air bearing surface to a first trailing shield throat height (TH1); and a main shield portion that is magnetically connected with the magnetic pedestal portion, the main shield portion extending from the air bearing surface to a second throat height (TH2) that is greater than TH1; wherein:

the pole tip of the write pole has first and second laterally opposed sides extending from the trailing edge to the leading edge;

the magnetic pedestal portion of the trailing shield has first and second sides that are aligned with the first and second sides of the write pole at the trailing edge; and the main shield portion extends beyond the first and second sides of the magnetic pedestal portion.

8. A write head as in claim 7 wherein the pedestal portion has a thickness of 10-100 nm as measured from the non-magnetic trailing gap to the main shield portion.

\* \* \* \* \*

UNITED STATES PATENT AND TRADEMARK OFFICE
CERTIFICATE OF CORRECTION

Page 1 of 1

PATENT NO.         : 8,068,312 B2
APPLICATION NO.    : 11/944157
DATED              : November 29, 2011
INVENTOR(S)        : Ming Jiang et al.

It is certified that error appears in the above-identified patent and that said Letters Patent is hereby corrected as shown below:

In the Specification:

Column 6, line 13 replace "till layer" with --fill layer--.

Signed and Sealed this
Fourteenth Day of July, 2015

Michelle K. Lee
*Director of the United States Patent and Trademark Office*